(12) United States Patent
Goebel et al.

(10) Patent No.: US 7,905,087 B2
(45) Date of Patent: Mar. 15, 2011

(54) METHOD FOR REGENERATING NITROGEN OXIDE STORAGE CATALYSTS

(75) Inventors: Ulrich Goebel, Hattersheim (DE); Stephan Bremm, Kahl (DE); Christian Manfred Tomanik, Reiskirchen (DE); Wilfried Mueller, Karben (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 533 days.

(21) Appl. No.: 11/995,765

(22) PCT Filed: Jun. 22, 2006

(86) PCT No.: PCT/EP2006/005994
§ 371 (c)(1),
(2), (4) Date: Jul. 17, 2008

(87) PCT Pub. No.: WO2007/009550
PCT Pub. Date: Jan. 25, 2007

(65) Prior Publication Data
US 2009/0145112 A1    Jun. 11, 2009

(30) Foreign Application Priority Data

Jul. 16, 2005   (DE) .................. 10 2005 033 395

(51) Int. Cl.
*F01N 3/00* (2006.01)
(52) U.S. Cl. .................. 60/295; 60/286; 60/289
(58) Field of Classification Search .......... 60/295
See application file for complete search history.

(56) References Cited

U.S. PATENT DOCUMENTS

| 5,388,403 | A |   | 2/1995  | Nagami et al. |        |
|-----------|---|---|---------|---------------|--------|
| 5,461,857 | A | * | 10/1995 | Itou et al.   | 60/276 |

(Continued)

FOREIGN PATENT DOCUMENTS

DE          10326592 A1    12/2004

(Continued)

OTHER PUBLICATIONS

International Search Report (PCT/EP2006/005994).

(Continued)

*Primary Examiner* — Thomas E Denion
*Assistant Examiner* — Jason Shanske
(74) *Attorney, Agent, or Firm* — Kalow & Springut LLP; William D. Schmidt

(57) ABSTRACT

Nitrogen oxide storage catalytic converters for purifying the exhaust gas of lean-burn engines are periodically regenerated by switching the engine from lean-burn mode to rich-burn mode. After regeneration has taken place, the engine is switched back to lean-burn mode. At this time, rich exhaust gas is still flowing in the exhaust line from the engine to the catalytic converter, which rich exhaust gas is ejected via the catalytic converter into the environment by the following, lean exhaust gas. This leads to brief emissions peaks of the rich exhaust gas constituents and impairs the level of exhaust gas cleaning which can be obtained. In order to solve said problem, it is proposed to create oxidizing conditions by injecting air upstream of the storage catalytic converter, so that the rich exhaust gas constituents still flowing in the exhaust line upstream of the storage catalytic converter can be converted at the storage catalytic converter to form non-harmful products. The proposed method can lead to a considerable improvement in exhaust gas purification in particular in the case of catalytic converters which are already impaired in terms of their storage capacity through aging, and which must be regenerated significantly more frequently than fresh catalytic converters.

8 Claims, 1 Drawing Sheet

U.S. PATENT DOCUMENTS

| | | | |
|---|---|---|---|
| 5,551,231 A * | 9/1996 | Tanaka et al. | 60/289 |
| 5,722,236 A * | 3/1998 | Cullen et al. | 60/274 |
| 5,746,049 A * | 5/1998 | Cullen et al. | 60/274 |
| 6,293,094 B1 * | 9/2001 | Schmidt et al. | 60/284 |
| 6,672,051 B2 * | 1/2004 | Tamura et al. | 60/285 |
| 6,722,125 B1 | 4/2004 | Pfalzgraft | |

FOREIGN PATENT DOCUMENTS

| | | |
|---|---|---|
| JP | 06129236 | 5/1994 |
| JP | 06129237 A * | 5/1994 |

OTHER PUBLICATIONS

Written Opinion (PCT/EP2006/005994).

* cited by examiner

METHOD FOR REGENERATING NITROGEN OXIDE STORAGE CATALYSTS

FIELD OF THE INVENTION

The invention relates to a method for regenerating nitrogen oxide storage catalytic converters which reduces the short emissions peaks of hydrocarbons and carbon monoxide which usually occur during regeneration when switching back to the storage mode. The method is particularly advantageous in the case of catalytic converters which are already impaired through aging and which must be regenerated more frequently than fresh catalytic converters.

BACKGROUND OF THE INVENTION

Nitrogen oxide storage catalytic converters are used to remove the nitrogen oxides contained in the lean exhaust gas of so-called lean-burn engines. Here, the purification effect is based on the fact that, in a lean-burn operating phase (storage phase, lean-burn mode) of the engine, the nitrogen oxides are stored by the storage material of the storage catalytic converter in the form of nitrates. In a subsequent rich-burn operating phase (regeneration phase, rich-burn mode) of the engine, the previously-formed nitrates are broken down and the released nitrogen oxides are converted with the rich constituents, which have a reducing action, of the exhaust gas during the rich-burn mode at the storage catalytic converter to form nitrogen, carbon dioxide and water. Rich constituents of the exhaust gas include hydrocarbons, carbon monoxide and hydrogen.

The mode of operation of nitrogen oxide storage catalytic converters is described in detail in the SAE document SAE 950809. The composition of nitrogen oxide storage catalytic converters is sufficiently well-known to a person skilled in the art. The nitrogen oxide storage materials are generally alkaline compounds of alkali or earth alkali metals such as, for example, oxides, hydroxides or carbonates of barium and strontium which are applied in finely distributed form to suitable support materials. In addition, a nitrogen oxide storage catalytic converter also has catalytically active noble metals of the platinum group and oxygen storage materials. Said composition gives a nitrogen oxide catalytic converter the function of a three-way catalytic converter under stoichiometric operating conditions.

The storage phase (lean-burn mode) usually lasts 100 to 200 seconds and is dependent on the storage capacity of the catalytic converter and the concentration of the nitrogen oxides in the exhaust gas. In the case of aged catalytic converters with reduced storage capacity, the duration of the storage phase can however also fall to 50 seconds and less. The regeneration phase (rich-burn mode) is, in contrast, always significantly shorter and lasts only a few seconds. The exhaust gas emerging from the nitrogen oxide storage catalytic converter during regeneration is substantially free of pollutants, and is of stoichiometric composition. Its air ratio $\lambda$ is approximately equal to 1 during said time.

At the end of the regeneration phase, the released nitrogen oxides and the oxygen which is attached to the oxygen storage components of the catalytic converter are no longer sufficient to oxidize all the rich exhaust gas constituents. There is therefore a breakthrough of said constituents through the catalytic converter, and the air ratio falls to a value below 1. Said breakthrough indicates the end of the regeneration and can be registered by means of a so-called lambda probe downstream of the storage catalytic converter.

The regeneration of a storage catalytic converter is therefore inevitably associated with short emissions peaks of hydrocarbons and carbon monoxide, which are intensified yet further by the following effect: the exhaust line between the engine and storage catalytic converter usually has a finite length. During the switch from the rich-burn mode into the lean-burn mode, the entire exhaust line is still filled with rich exhaust gas, which is discharged via the catalytic converter into the environment after the switch by the now-lean exhaust gas of the engine. The catalytic converter can no longer purify said residual proportion of rich exhaust gas, since the previously stored, oxidizing constituents were already consumed during the rich-burn mode. There is therefore a resulting intensified emissions peak of hydrocarbons and carbon monoxide at the end of a regeneration.

SUMMARY OF THE INVENTION

It is an object of the present invention to specify a method which is capable of reducing the emissions peaks, and to permit improved exhaust gas purification overall, in particular in the case of already-aged storage catalytic converters.

Said object is achieved by means of a method for regenerating a nitrogen oxide storage catalytic converter, which is arranged in the exhaust line of a lean-burn engine, by switching the engine from lean-burn mode with lean exhaust gas to rich-burn mode with rich exhaust gas, and switching back to the lean-burn mode after regeneration has taken place. The method is characterized in that, with the switch back to the lean-burn mode, air is injected into the exhaust gas directly upstream of the storage catalytic converter, and therefore the temporarily still-rich exhaust gas composition is changed to a stoichiometric or lean composition, until the now-lean exhaust gas of the engine reaches the storage catalytic converter.

The temporary injection of air into the exhaust line is already known for example from DE 198 02 631 C1, which describes an exhaust gas purification system for a lean-burn engine composed of a nitrogen oxide storage catalytic converter and a $SO_x$ storage catalytic converter arranged upstream thereof in the exhaust line. In said document, the additional air is utilized to increase the temperature of the $SO_x$ catalytic converter to the desulfurizing temperature for the purpose of desulfurizing. The oxygen of the additional air is converted here with a part of the reductive constituents of the exhaust gas at the $SO_x$ storage catalytic converter with the release of heat energy while maintaining a reducing exhaust gas composition. The injection of the additional air begins with the switching of the engine from lean-burn mode into the rich-burn mode.

According to the invention, in contrast, the composition of the rich exhaust gas which is still flowing in the exhaust line between the engine and the catalytic converter after the switch from the rich-burn mode into the lean-burn mode is moved into the stoichiometric or superstoichiometric, lean range by injecting air, so that the storage catalytic converter is capable of converting the reductive constituents, which are contained in the exhaust gas, with oxygen. The emissions peaks of reductive exhaust gas constituents which unavoidably occur when switching from the rich-burn mode into the lean-burn mode are therefore reduced to the minimum required level.

The duration of the air injection is dependent on the running time of the exhaust gas between the engine and catalytic converter, and results from the length of the exhaust line and the flow speed of the exhaust gas at the respective operating point of the engine. The quantity of air injected into the exhaust gas should move the air ratio of the exhaust gas upstream of the inlet into the storage catalytic converter into the stoichiometric or superstoichiometric, lean range. The intensity of the air injection is preferably dimensioned such that the resulting gas mixture has an air ratio λ of equal to or greater than 1, and in particular between 1 and 1.3, and particularly preferably between 1 and 1.05. An excessively intense air injection should be avoided in order to keep the cooling of the exhaust gas by the cold air as low as possible.

BRIEF DESCRIPTION OF THE FIGURES

The invention is explained in more detail below on the basis of FIGS. 1 and 2, in which.

DETAILED DESCRIPTION OF THE PREFERRED EMBODIMENTS

Figure 1:
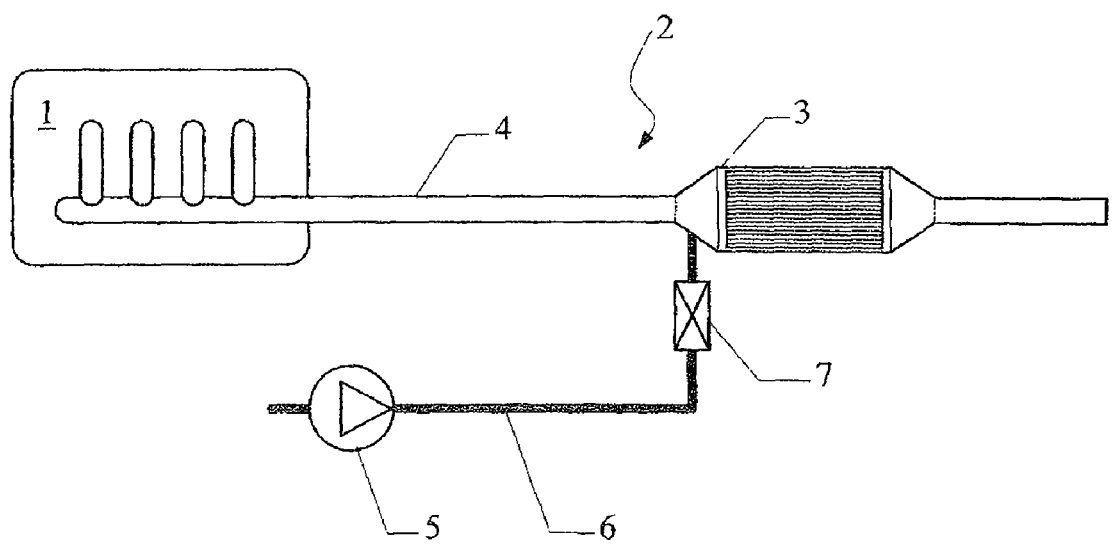
FIG. 1: shows an internal combustion engine having an exhaust gas purification system and secondary air supply for carrying out the method according to the invention.

In FIG. 1, the internal combustion engine (1) is provided with an exhaust gas purification system (2) which comprises a converter housing (3) with a nitrogen oxide storage catalytic converter. The converter housing is connected by means of the exhaust line (4) and the exhaust manifold to the cylinders of the internal combustion engine. For air injection a short distance upstream of the nitrogen oxide storage catalytic converter, a secondary air pump (5) is provided. The air supply line (6) opens out a short distance upstream of the storage catalytic converter into the exhaust system. The opening-out point can be situated here a short distance upstream of the converter housing or can take place directly into the converter housing. A metering valve (7) serves for metering the air injection at the correct time and in the correct quantity.

As already discussed, the regeneration of the storage catalytic converter lasts only a few seconds, and the discharge of the residual rich exhaust gas by the following lean exhaust gas out of the exhaust line between the cylinders of the engine and the storage catalytic converter ends even after a fraction of a second. In order to ensure a fast provision of the air, it is therefore expedient to operate the secondary air pump continuously and to carry out the metering of the air at the correct time by means of the valve. It is however more energy-saving to always start the secondary air pump only at the beginning of the regeneration phase, and to likewise carry out the metering of the air by means of the valve. After the shut-off of the air injection, the secondary air pump is also shut off again.

Figure 2:
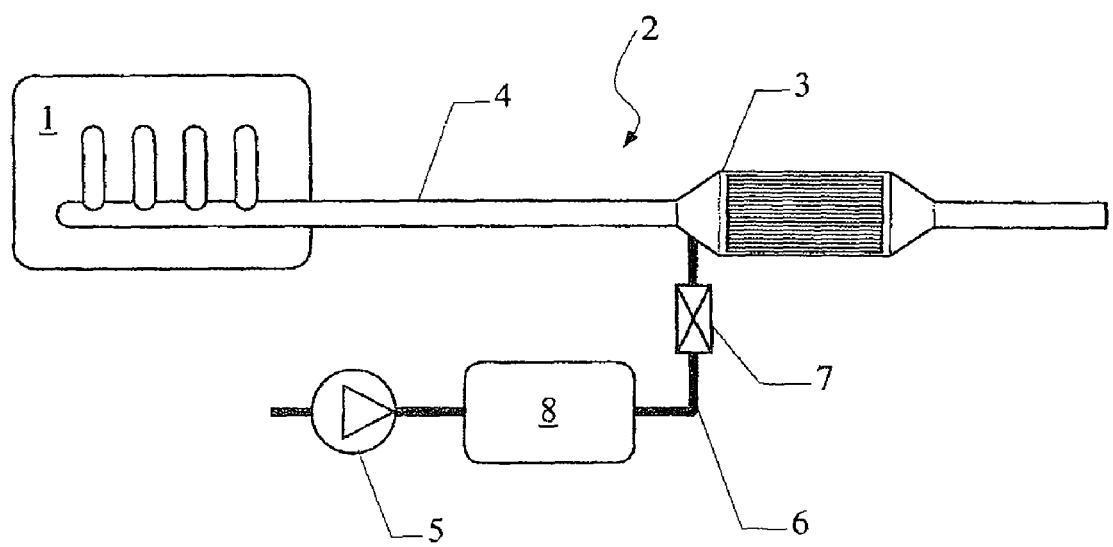
FIG. 2: shows an internal combustion engine having an exhaust gas purification system and an alternative secondary air supply for carrying out the method according to the invention.

In FIG. 2, the internal combustion engine is provided with an alternative secondary air supply. In said arrangement, a compressed air store (8) is provided, from which the air for the air injection is extracted via the valve (6). The pressure in the compressed air store is kept in a predefined pressure interval by the secondary air pump. The secondary air pump is always started when the pressure in the store falls below a lower limit value, and is shut off when the pressure exceeds a predefined upper limit value. In this way, the starting processes of the secondary air pump are decoupled from the regeneration events, and the number of starting processes is reduced overall in relation to the arrangement from FIG. 1.

What is claimed is:

1. A method for regenerating a nitrogen oxide storage catalytic converter, which is arranged in the exhaust line of a lean-burn engine, by switching the engine from lean-burn mode with lean exhaust gas to rich-burn mode with rich exhaust gas, and switching back to the lean-burn mode after regeneration has taken place, characterized in that, with the switch back to the lean-burn mode, air is injected into the exhaust gas directly upstream of the storage catalytic converter, and therefore the temporarily still-rich exhaust gas composition is changed to a stoichiometric or lean composition, until the now-lean exhaust gas of the engine reaches the storage catalytic converter.

2. The method as claimed in claim 1, characterized in that the quantity of the air injected into the exhaust gas is dimensioned such that the resulting gas mixture has an air ratio λ of equal to or greater than 1.

3. The method as claimed in claim 2, characterized in that the quantity of the air injected into the exhaust gas is dimensioned such that the resulting gas mixture has an air ratio λ of between 1 and 1.05.

4. The method as claimed in claim 1, characterized
in that the required air is provided by a secondary air pump (5) and is admixed to the exhaust gas at the correct time and in the correct quantity by means of a valve (7).

5. The method as claimed in claim 4, characterized
in that the secondary air pump is operated continuously.

6. The method as claimed in claim 4, characterized
in that the secondary air pump is only started shortly before the end of the rich-burn mode and is shut off again after the end of the supply of air to the exhaust gas.

7. The method as claimed in claim 4, characterized
in that the secondary air pump is started at the beginning of the rich-burn mode.

8. The method as claimed in claim 4, characterized
in that the secondary air pump supplies air to a compressed air store (8), from which the air is extracted for the air injection via the valve (7).

* * * * *